United States Patent [19]

Tatami

[11] 4,063,284
[45] Dec. 13, 1977

[54] TIME BASE CORRECTOR

[75] Inventor: Mitsushige Tatami, Yokohama, Japan

[73] Assignee: Sony Corporation, Tokyo, Japan

[21] Appl. No.: 642,197

[22] Filed: Dec. 18, 1975

[30] Foreign Application Priority Data

Dec. 25, 1974 Japan .................................. 50-3855
May 2, 1975 Japan .................................. 50-53406

[51] Int. Cl.² ............................................ H04N 5/76
[52] U.S. Cl. .................................... 358/127; 360/36; 360/38
[58] Field of Search ....................... 360/36, 38, 54, 26; 178/6.6 TC, 6.6 DC; 358/127, 128, 8, 4

[56] References Cited

U.S. PATENT DOCUMENTS

| 3,316,544 | 4/1967 | Anderson | 360/54 |
| 3,463,874 | 8/1969 | Hodge | 360/38 |
| 3,860,952 | 1/1975 | Tallent | 360/36 |

*Primary Examiner*—Bernard Konick
*Assistant Examiner*—Alan Faber
*Attorney, Agent, or Firm*—Lewis H. Eslinger; Alvin Sinderbrand

[57] ABSTRACT

Time base errors, such as are introduced in video or other information signals by the recording and/or reproducing thereof, are removed by writing successive line or other intervals of the video signals in a memory at a clocking rate which varies generally in accordance with the time base erros, and by reading out the video signals from the memory at a standard clocking rate. The memory is composed of at least three registers having repeating cyclic orders or sequences of writing and reading, respectively, and the video signals being read out of each register are recycled or rewritten in the same register. The reading and writing operations are controlled so that the occurrence of excessive time base errors causes the writing or reading period of a register to be extended, for example, from a normal one line interval to two line intervals, so as to either omit or repeat, respectively, a line interval of the video signals in the output from the time base corrector. Further, in response to a detected drop out in the incoming video signals, the writing period of a register is extended so as to omit or delete the line interval containing the drop out from the temporarily stored video signals and, during reading out of the stored signals, the line interval preceding the deleted line interval is read twice to replace the omitted line interval.

18 Claims, 6 Drawing Figures

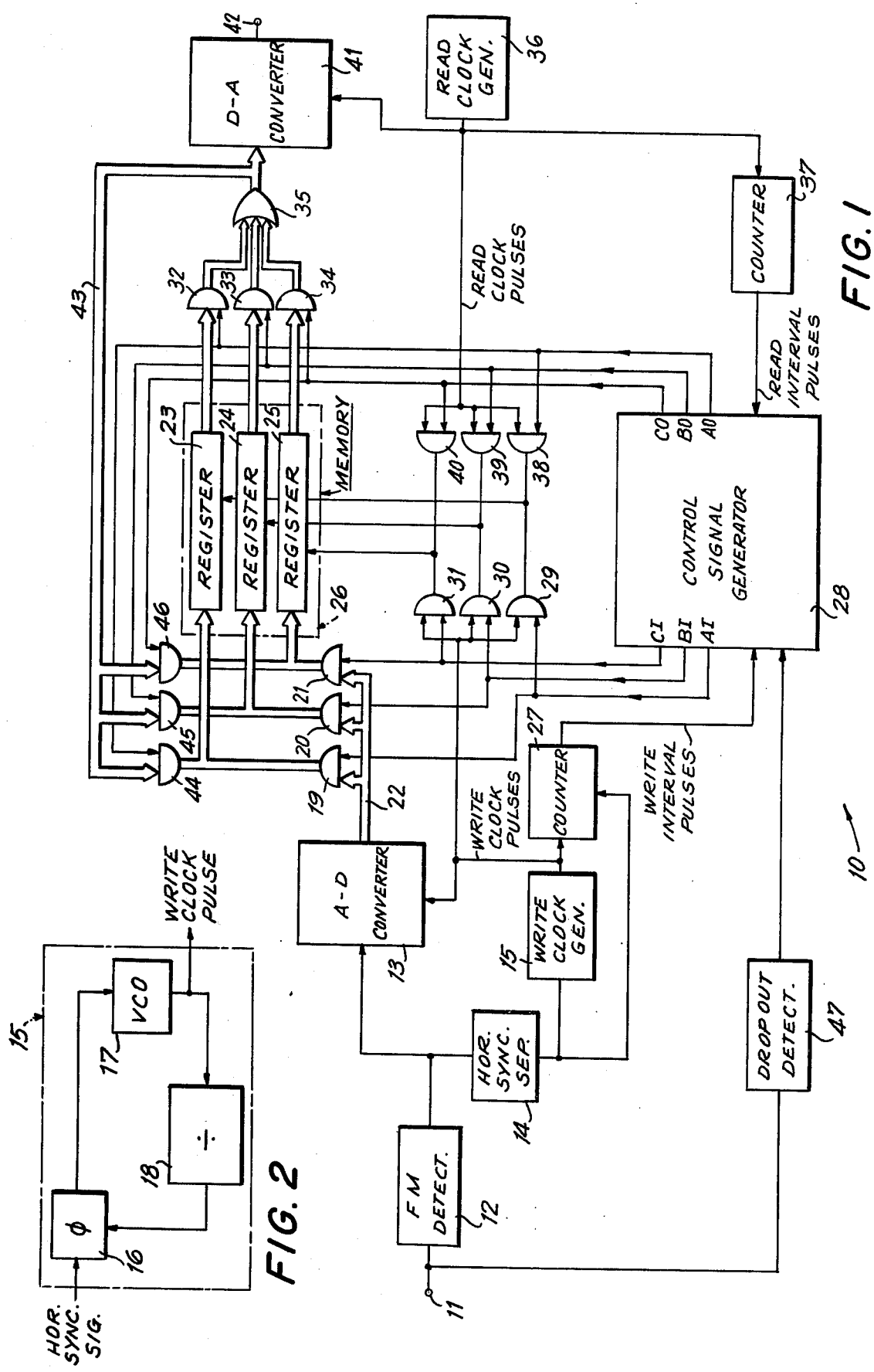

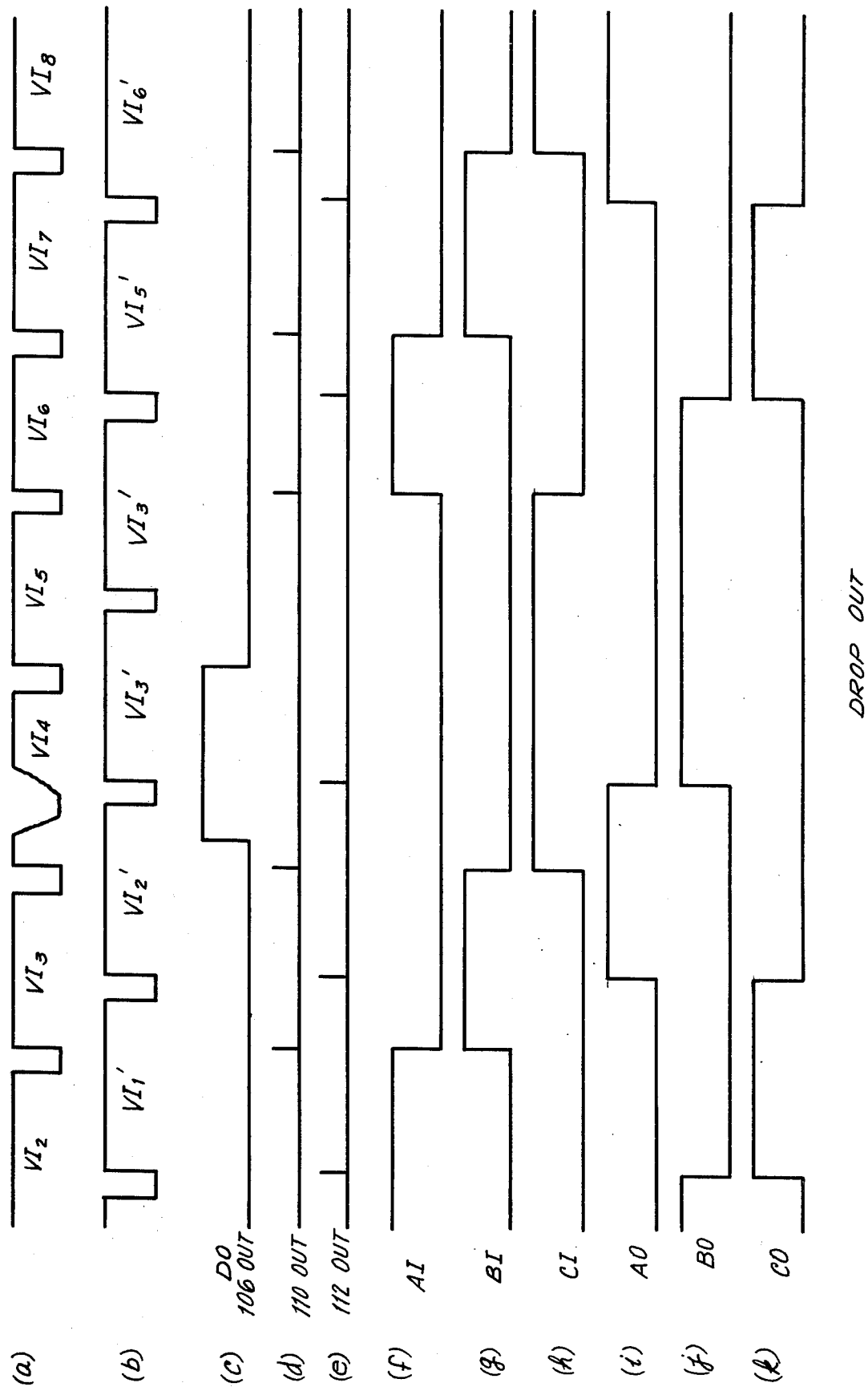

TIME BASE CORRECTOR

BACKGROUND OF THE INVENTION

1. Field of the Invention

This invention relates to the processing of periodic information signals, such as, video signals, and more particularly is directed to apparatus by which time base errors introduced during recording and/or reproducing of such signals may be removed.

2. Description of the Prior Art

Video signals are frequently recorded on magnetic tape and subsequently reproduced for later broadcasting or viewing purposes. During the reproduction of recorded video signals, time base or frequency errors are usually introduced by reason of expansion or contraction of the record medium during or after recording, variation in the speed of the tape relative to the magnetic head or heads during recording or reproduction, variation between the tape recording speed and the tape reproducing speed, and the like. The presence of such time base errors in the reproduced video signals cause a frequency shift of the latter which can result in many observable undesirable effects, particularly when the reproduced video signals are to be transmitted or broadcast and may be mixed with live broadcast material that do not have such time base errors. The observable undesirable effects resulting from relatively small time base errors are a smeared or jittery picture with erroneous intensity variations and, in the case of color video signals, improper color display. When the time base errors are large, the reproduced picture will fail to lock horizontally or vertically.

Time base correctors are known for the purpose of substantially removing time base errors from video signals. These time base correctors usually employ tapped delay lines, or other variable delay elements, for introducing variable delay in the incoming video signals in order to compensate for the undesired frequency variations or time base errors in such incoming signals. Such time base correctors employing variable delay elements are only capable of correcting relatively small time base errors of the magnitude that are encountered when recording and/or reproducing the video signals by means of an apparatus having four rotary heads. However, when the video signals are recorded and/or reproduced by means of an apparatus having only two alternately operative rotary magnetic heads, the possible magnitudes of the time base errors in the reproduced video signals are too large to be corrected or compensated for by means of the variable delay elements.

In view of the foregoing, it has been proposed, for example, as disclosed in U.S. Pat. No. 3,860,952, issued Jan. 14, 1975, to provide a time base corrector for processing video signals in which the incoming video signals are converted from analog to digital form and temporarily stored in a memory unit. Time base errors are removed from the video signals by writing the digitized signals in the memory unit at a clocking rate which varies in a manner generally proportional to the time base errors, and by fetching or reading out these stored signals at a standard clocking rate. After such reading out of the digitized video signals, the latter are reconverted to analog form and applied to an output terminal. The memory unit used as aforesaid comprises a plurality of memories or shift registers each capable of storing a plurality of horizontal lines of video information, and a sequence control unit controls the selection of each memory for writing and reading in such a manner that double clocking of a single memory which marginally occurs at the extreme boundaries of the correction range is relieved. However, the arrangement disclosed in the above identified patent for preventing double clocking of a single memory, that is, an attempt to read and write contemporaneously from the same memory in response to an excessive time base error, results in at least one incomplete or otherwise deteriorated line interval signal, and possibly even two incomplete or deteriorated line interval signals which are out of horizontal synchronization with each other and which are present in the output from the time base corrector. Further, the known time base corrector is not capable of eliminating from its output those line intervals of the incoming video signals in which drop outs may occur.

OBJECTS AND SUMMARY OF THE INVENTION

Accordingly, it is an object of this invention to provide a time base corrector by which time base errors may be removed from video or other periodic information signals without the above described problems encountered in the prior art.

More specifically, it is an object of this invention to provide a time base corrector by which even relatively large time base errors may be removed from video or other periodic information signals through the use of a memory made up of registers of relatively small capacity.

Another object is to provide a time base corrector, as aforesaid, which is further operative to remove any drop outs occurring in the incoming video signals.

In accordance with an aspect of this invention, time base errors, such as are introduced in video or other periodic information signals by the recording and/or reproducing thereof, are removed by writing successive line or other intervals of the video signals in a memory at a clocking rate which varies generally in accordance with the time base errors, and by reading out the video signals from the memory at a standard clocking rate. The memory is composed of a plurality of registers having repeating cyclic orders or sequences of writing and reading, respectively, and the video signals being read out from each register are recycled or rewritten in the same register. The writing and reading operations are controlled so that the occurrence of excessive time base errors causes the writing or reading period of a register to be extended, for example, from a normal one line interval to two line intervals, so as to either omit or repeat, respectively, in the output from the time base corrector a line interval of the incoming video signals.

Further, in accordance with a feature of the invention, drop out in the incoming video signals is detected and, in response to such detection, the writing period of a register is extended so as to omit or delete the line interval containing the drop out from the temporarily stored video signals and, during reading out of the stored signals, the line interval preceding the deleted line interval is read twice to replace the omitted line interval.

The above, and other objects, features and advantages of the invention, will be apparent in the following detailed description of an illustrative embodiment which is to be read in conjunction with the accompanying drawings.

BRIEF DESCRIPTION OF THE DRAWINGS

FIG. 1 is a schematic block diagram of a time base corrector according to an embodiment of this invention;

FIG. 2 is a schematic block diagram showing, in greater detail, the components of a write clock generator included in the time base corrector of FIG. 1;

DESCRIPTION OF A PREFERRED EMBODIMENT

Figure 3:
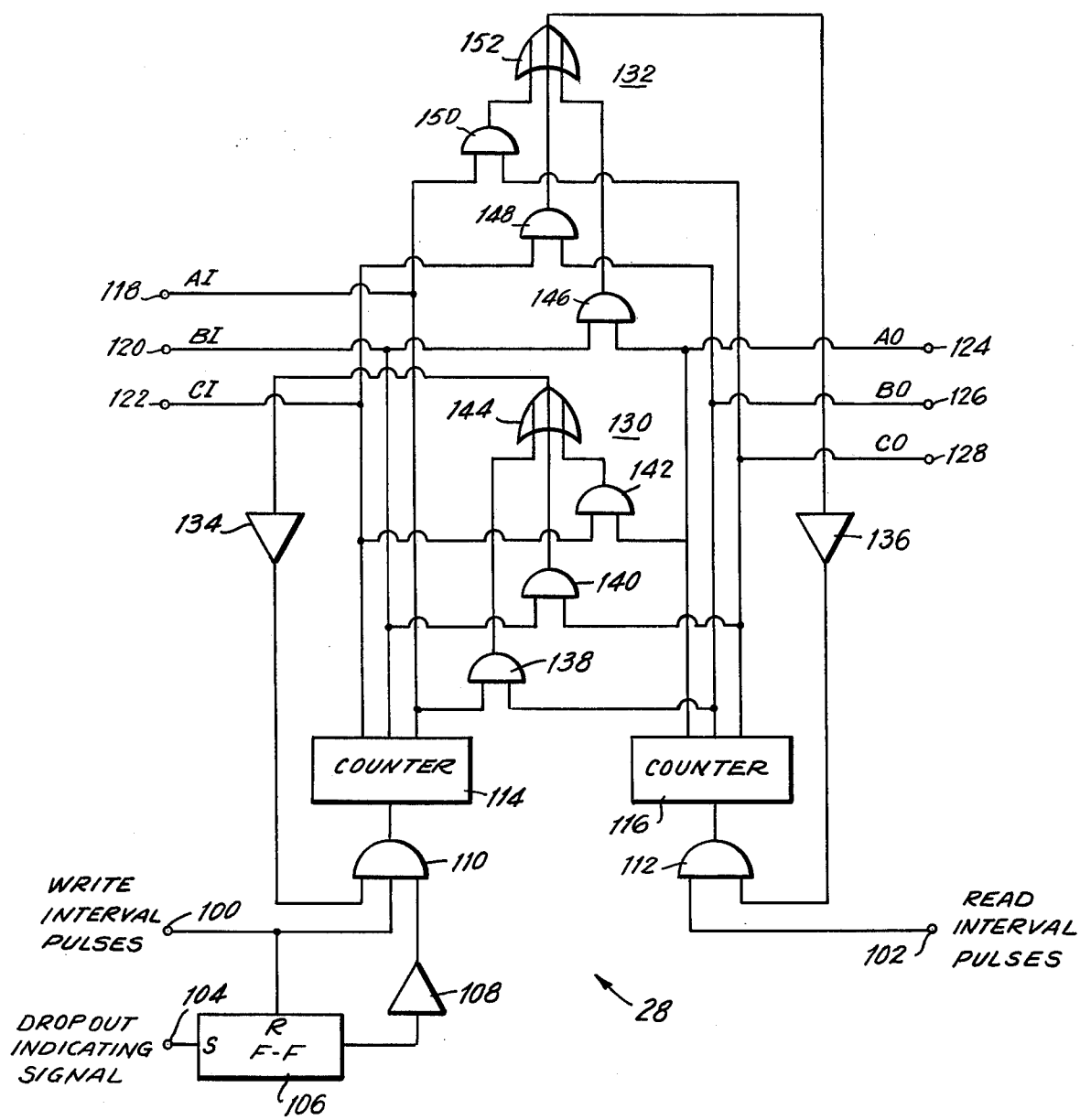
FIG. 3 is a schematic diagram illustrating a control signal generator included in the time base corrector of FIG. 1.

Referring to the drawings in detail, and initially to FIG. 1 thereof, it will be seen that a time base corrector 10 according to an embodiment of this invention has an input terminal 11 to which periodic information signals, such as, reproduced video signals having time base errors, are applied. An FM detector 12 receives the incoming video signals from terminal 11 and applies detected or demodulated video signals to an analog to digital or A-D converter 13. The demodulated video signals are further applied to a separator 14 which separates horizontal synchronizing signals therefrom for application to a write clock generator 15. The write clock generator 15 produces write clock pulses having a relatively high frequency, for example, of about 10.7 MHz which is three times the color subcarrier frequency for NTSC signals, and which is dependent upon time base errors in the incoming video signals. As shown particularly on FIG. 2, write clock generator 15 may include a frequency and phase comparator 16, a voltage controlled oscillator 17 having a center frequency of about 10.7 MHz and a divider circuit 18. The output of voltage controlled oscillator 17 is applied to divider circuit 18 which divides such oscillator output sufficiently to make the same comparable, in comparator 16, with the horizontal synchronizing signals applied to comparator 16 from separator 14, and comparator 16 provides a DC correction voltage which controls the output frequency of voltage controlled oscillator 17 and the amplitude of which varies with the phase difference between the input signals to comparator 16 from separator 14 and divider 18.

Although the write clock generator 15, as described above with reference to FIG. 2, produces write clock pulses at a frequency or repetition rate which is varied in accordance with variations in the frequency of the horizontal synchronizing signals of the incoming video signals, it will be apparent that, when the incoming video signals are color video signals, the write clock pulses from generator 15 may have their frequency or repetition rate varied in accordance with changes in the frequency of the subcarrier burst signal extracted from the incoming color video signals so as to more closely follow, or be dependent upon time base errors in such incoming signals.

Returning to FIG. 1, it will be seen that the write clock pulses having a frequency of approximately 10.7MHz are applied to A-D converter 13 to control the rate at which the latter samples the demodulated or detected video signals and converts the latter from their original analog form into digital form. More specifically, in response to each write clock pulse from generator 15, A-D converter 13 is operative to sample the demodulated video signal and convert the latter into a plurality of parallel bit signals, for example, digital information of eight bits. The parallel bit signals are supplied from converter 13 to a plurality of input gates 19,20 and 21, in parallel, by way of a digital information line 22 which, for purposes of simplicity in illustration, is represented by a double line on FIG. 1. Although each of the input gates 19,20 and 21 is illustrated as a single AND gate, it will be understood that each of the input gates 19,20 and 21 is composed of a plurality of AND gates equal in number to the number of bits making up of the digitized video signals. The outputs of input gates 19,20 and 21 are respectively connected to register units 23,24 and 25 of a digital memory 26. Each of the register units 23,24 and 25 is comprised of a plurality of shift registers equal to the number of bits making up the digitized video signals. Thus, in the example being described, each of the three register units 23,24 and 25 is made up of eight shift registers, and each register unit is selected to have a memory or storage capacity which, in consideration of the frequency of the write clock pulse, is sufficient to store one horizontal or line interval of the incoming video signals or any other whole multiple of such horizontal or line intervals. When the incoming periodic information signals are color video signals, the horizontal and vertical synchronizing signals, blanking pulses and burst signals may be stripped from the incoming signals prior to the conversion of the latter to digital form and thus are not stored in memory 26, for example, as disclosed in U.S. Pat. No. 3,860,952, in which case, the capacities of register units 23,24 and 25 may be reduced for storing one or any other whole multiple of a line interval exclusive of the portions of such interval occupied by the synchronizing and burst signals and the blanking pulses.

The write clock pulses are further applied from generator 15 to a counter 27 which produces a write interval pulse, for example, at the end of each horizontal or line interval of the incoming video signals, and which is reset by the horizontal synchronizing signals from separator 14. The write interval pulses from counter 27 are applied to a control signal generator 28 which, as hereinafter described in detail, produces write control signals AI,BI and CI in a repeating cyclic order, and which are respectively applied to input gates 19, 20 and 21 in order to determine the sequences in which register units 23,24 and 25 are selected for the writing therein of the successive line intervals of the digitized video signals.

The write clock pulses from generator 15 are further supplied to write clock select or AND gates 29, 30 and 31, in parallel, and such AND gates 29,30 and 31 further respectively receive the write control signals AI, BI and CI and have their outputs connected to the register units 23,24 and 25, respectively. Thus, during the period or interval determined by the write control signal AI, BI or CI, the digitized video signals are passed through input gate 19,20 or 21, respectively, to the selected register unit 23,24 or 25, while such selected register unit simultaneously receives the write clock pulses through the respective write clock select gate 29,30 or 31 for writing of the digitized video signals in the shift registers of the selected register unit.

After momentary storage in register units 23, 24 and 25, the digitized video signals are read out therefrom, in sequence, as hereinafter described in detail, and passed through output gates 32, 33 and 34, respectively, and an OR gate or circuit 35. Although each of output gates 32,33 and 34 is represented by a single AND gate on FIG. 1, it will be appreciated that, as in the case of the input gates 19,20 and 21, each of the output gates 32,33 and 34 is comprised of a plurality of AND gates respectively corresponding to the shift registers of the respective register unit 23, 24 or 25. In order to control the reading out of the stored video signals from register units 23,24 and 25, the time base corrector 10 is further shown to include a read clock generator 36 which produces read clock pulses at a standard frequency, for example, 10.70 MHz, at least at the beginning and end of each standard horizontal or line interval. Such read clock pulses are applied to a counter 37 which produces a read interval pulse at the beginning of each standard line interval, and the read interval pulses are applied to control signal generator 28 which, as hereinafter described in detail, is operative to produce read control pulses AO,BO and CO in a repeating cyclic order. Such read control signals AO,BO and CO are applied to output gates 32, 33 and 34, respectively, for determining the sequence in which the stored video signals are read out of the shift registers of units 23,24 and 25. Further, the read clock pulses from generator 36 are applied to read clock select AND gates 38,39 and 40, in parallel, and such gates 38,39 and 40 are respectively gated by the read control signals AO,BO and CO. The gates 38,39 and 40 have their outputs respectively connected to register units 23,24 and 25 so that, upon the occurrence of the read control signal AO,BO or CO, the respective gates 32 and 38, 33 and 39, or 34 and 40 are opened to cause read out of the stored video signals from the shift registers of the respective unit 23, 24 or 25 at a clocking rate determined by the read clock pulses from generator 36.

The read clock pulses from generator 36 are further applied to a digital to analog or D-A converter 41 which also receives the output of OR circuit 35 and which is operative to convert the digitized video signals sequentially read out from register units 23,24 and 25 back to the original analog form, with the video signals in analog form being applied to an output terminal 42. It will be apparent that, in the time base corrector 10, as described above, successive line intervals of the incoming video signals are written in memory 26 at a clocking rate which varies generally in accordance with the time base errors of the incoming signals, and that the video signals are read out from memory 26 at a standard clocking rate so that the video signals obtained at output terminals 42 have any time base errors removed therefrom.

In accordance with the present invention, the time base corrector 10 is further provided with a recycle loop 43 through which the output or OR circuit 35 is also applied to recycle gates 44,45 and 46, in parallel. Although each of recycle gates 44,45 and 46 is represented as a single AND gate, it will be apparent that each recycle gate comprises a plurality of AND gates which respectively correspond to the shift registers of the respective register unit. The recycle gates 44,45 and 46 are also shown to receive the read control signals AO,BO and CO, respectively, and have their outputs connected to the writing terminals of register units 23,24 and 25, respectively. Thus, upon the occurrence of the read control signal AO,BO or CO for causing reading out of the signals stored in register unit 23, 24 or 25, the signals being read out from a register unit are simultaneously applied through recycle loop 43 and a recycle gate 44,45 or 46 so as to be rewritten in the respective register unit 23,24 or 25.

It will also be seen from FIG. 1 that the time base corrector 10 according to this invention preferably includes a drop out detector 47 which is connected to input terminal 11 for detecting any drop out in the incoming or reproduced video signals, and for supplying a drop out indicating signal to control signal generator 28 in response to detection of drop out.

Figure 4:
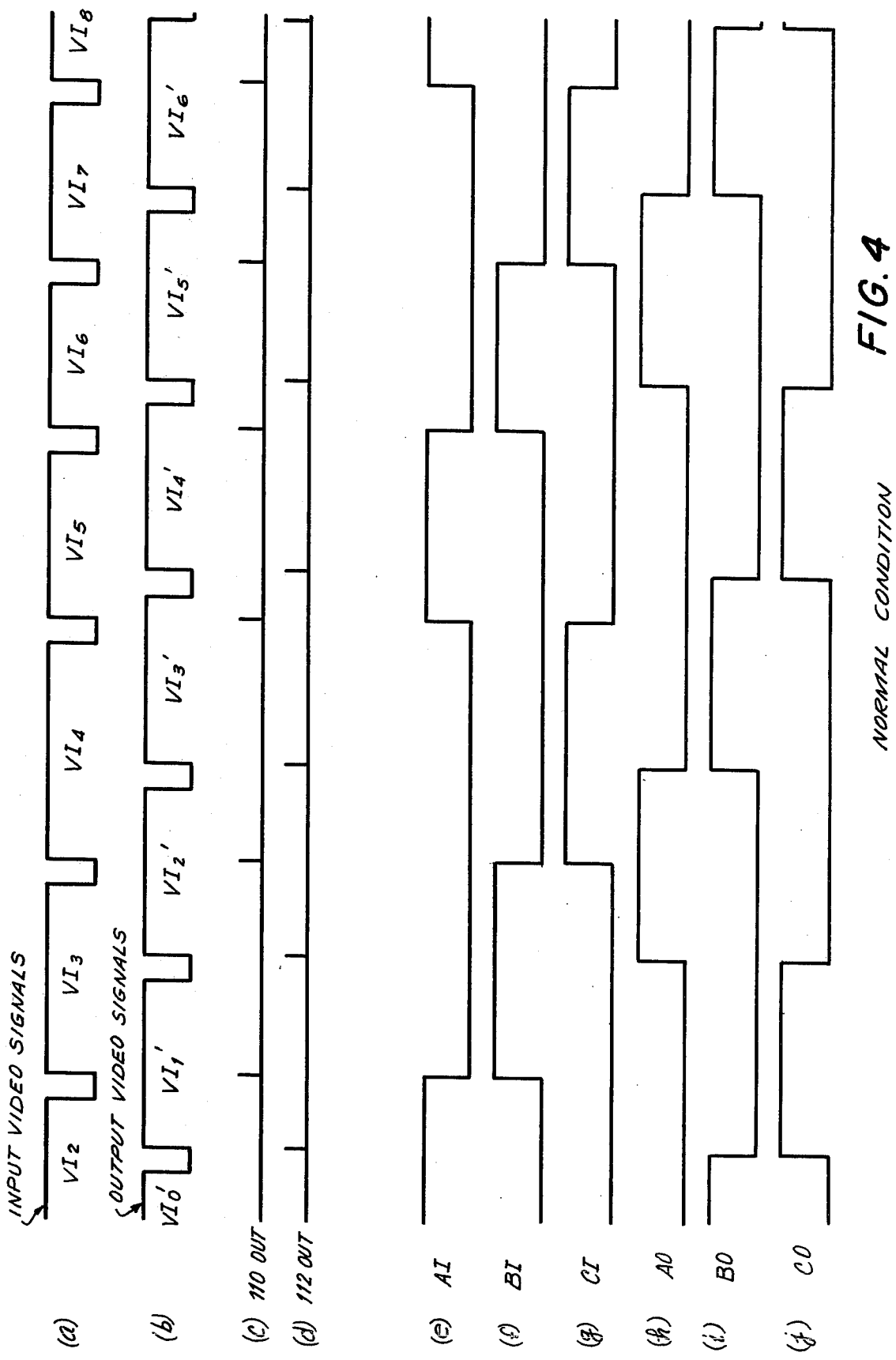
FIGS. 4, including 4a through 4j, 5 including 5a through 5l and 6 including 6a through 6k are waveform diagrams to which reference will be made in explaining the operation, under various conditions, of the time base corrector according to this invention.

Referring now to FIG. 3, it will be seen that the control signal generator 28 of the time base corrector according to this invention preferably has input terminals 100 and 102 which respectively receive the write interval pulses from counter 27 and the read interval pulses from counter 37. Control signal generator 28 is further shown to have an input terminal 104 which receives the drop out indicating signal from drop out detector 47 and which is connected to the set terminal of a flip-flop 106. The reset terminal of flip-flop 106 is connected to input terminal 100 for receiving the write interval pulses therefrom, and the output of flip-flop 106 is applied through an inverter 108 to an AND circuit 110 which also receives the write interval pulses from input terminal 100. The read interval pulses are shown to be applied from input terminal 102 to a second AND circuit 112. Under normal circumstances, that is, when the incoming video signals have relatively small time base errors, the write interval pulses and read interval pulses applied to input terminals 100 and 102, respectively, are passed through AND gates 110 and 112 to respective divide-by-three counters 114 and 116. The three stages of divide-by-three counter 114 are tapped to provide the three write control signals AI,BI and CI which are respectively provided at output terminals 118, 120 and 122. Similarly, the three stages of divide-by-three counter 116 are tapped to provide the three read control signals AO,BO and CO at output terminals 124, 126 and 128, respectively. As indicated at (e), (f) and (g) on FIG. 4, the write control signals AI,BI and CI are normally produced sucessively in repeating cycle order by counter 114 in response to the output pulses from AND circuit 110 indicated at (c) and which correspond to the write interval pulses applied to input terminal 100 so that each of the write control signals AI,BI and CI will be of positive polarity or at a relatively high level for a period corresponding to a respective line interval of the incoming video signals, for example, as indicated at (a) on FIG. 4. Similarly, as indicated at (h), (i) and (j) on FIG. 4, under normal circumstances the read control signals AO,BO and CO are produced successively in repeating cyclic order by counter 116 in response to the output pulses from AND circuit 112 which correspond to the read interval pulses applied to input terminal 102, with each of the read control pulses AO,BO and CO being of positive polarity or having a relatively high level for a period corresponding to a respective standard line interval. Further, the counters 114 and 116 are initially preset so that, under normal circumstances, the read control signals for each of the register units 23,24 and 25, will occur approximately midway between the successive write control signals for the same register unit. Thus, for example, it will be seen that each read control signal AO for the register unit 23 is shown at FIG. 4(h) to occur approximately midway between the successive write control signals AI for the unit 23 as shown at FIG. 4(e).

However, under other than normal circumstances, for example, when the incoming video signals have relatively large time base errors, the actuation of counters 114 and 116 by the write interval pulses and read interval pulses through AND circuits 110 and 112, respectively, may give rise to a situation in which an invalid attempt is made to effect simultaneous writing and reading operations of one of the register units 23,24 and 25.

In order to avoid such simultaneous writing and reading operations of any of the register units 23,24 and 25, the control signal generator 28 according to this invention is further shown to include logic circuits 130 and 132 which each receive the write control signals AI,BI and CI and the read control signals AO,BO and CO, and which are respectively operative to apply inhibiting signals through inverters 134 and 136 to AND circuits 110 and 112, respectively.

The logic circuit 130 is shown to include three AND gates 138,140 and 142 which respectively receive control signals AI and BO, control signals BI and CO and control signals CI and AO, and an OR circuit 144 connecting the outputs of AND gates 138,140 and 142 to inverter 134. The logic circuit 132 similarly includes three AND gates 146,148 and 150 having their outputs connected through an OR circuit 152 to the inverter 136 but, in the case of logic circuit 132, AND gates 146,148 and 150 respectively receive control signals BI and AO, control signals CI and BO and control signals AI and CO.

It will be apparent that, when there is no drop out indicating signal applied to terminal 104, flip-flop 106 provides a low level or negative polarity signal to inverter 108 so that the latter applies a positive polarity or high level signal to AND circuit 110. When the control signals respectively applied to AND gates 138,140 and 142, as described above, do not simultaneously occur, there is no output from any one of AND gates 138,140 and 142, and thus OR circuit 144 does not apply an inhibiting signal of relatively high level or positive polarity to inverter 134 with the result that the latter applies a signal of high level or positive polarity to AND circuit 110. Thus, with neither inverter 108 nor inverter 134 receiving an inhibiting signal from flip-flop 106 or from OR circuit 144, respectively, AND circuit 110 applies to the respective counter 114 each of the write interval pulses supplied to input terminal 100. Similarly, so long as the control signals applied to each of AND gates 146,148 and 150, respectively, as described above, do not simultaneously occur, no inhibiting signal of relatively high level or positive polarity issues from OR circuit 152 and, therefore, inverter 136 applies a signal of relatively high level or positive polarity to AND circuit 112 with the result that the successive read interval pulses applied to input terminal 102 are passed through AND circuit 112 for actuating the respective counter 116.

However, if a drop out indicating signal appears at input terminal 104, flip-flop 106 is set thereby so as to produce an inhibiting signal which causes inverter 108 to apply a signal of relatively lower level or negative polarity to AND circuit 110 with the result that the latter blocks the passage of write interval pulses from terminal 100 to counter 114 to hold up the sequencing of the latter until such time as a drop out indicating signal is no longer applied to terminal 104 and flip-flop 106 can be reset by the next occurring write interval pulse arriving at input terminal 100. Similarly, in the event that the control signals applied to AND gate 138,140 or 142 occur simultaneously, the resulting output passed through OR circuit 144 to inverter 134 causes the latter to apply a signal of relatively low level or negative polarity to AND circuit 110 with the result that the latter again blocks the sequencing of counter 114 by the write interval pulse then applied to input terminal 100. Thus, counter 114 is sequenced by the successive write interval pulses applied to input terminal 100 only so long as neither flip-flop 106 nor OR circuit 144 produces a sequence inhibiting signal or pulse. In a similar way, counter 116 is sequenced by the successive read interval pulses applied to terminal 102 only so long as OR circuit 152 does not produce a sequence inhibiting pulse or signal for causing inverter 136 to apply a low level or negative polarity signal to AND circuit 112, that is, only so long as the control signals applied to AND gates 146,148 and 150, respectively, do not occur simultaneously.

From the above description of the time base corrector 10 according to this invention, as shown on FIGS. 1,2 and 3, it will be apparent that the input gates 19,20 and 21 and the write clock select gates 29,30 and 31 form write selecting means actuated by the write clock pulses from generator 15 for writing each line interval of the incoming video signals into a selected one of the register units 23,24 and 25, that the output gates 32,33 and 34 and the read clock select gates 38,39 and 40 form read selecting means actuated by the read clock pulses from generator 36 for reading out the video signals stored in a selected one of the register units, and that such write and read selecting means are controlled by the write control signals AI,BI and CI and by the read control signals AO,BO and CO, respectively, produced by the control signal generator 28 for determining the sequence of the register units 23,24 and 25 in which the information signals are respectively written in, and read out from such register units of memory 26. Further, it will be seen that the recycle loop 43 and recycle gates 44, 45 and 46 form a recycle means made operative by the read control signals AO,BO and CO simultaneously with the reading out of video signals from each one of the register units 23, 24 and 25 for rewriting in the respective one of such register units the video signals which are being read out therefrom.

The operation of the time base corrector 10 according to this invention for various conditions of the incoming video signals will now be described with reference to FIGS. 4,5 and 6.

Referring first to FIG. 4 which relates to the normal operating condition in which the incoming video signals have relatively small time base errors or time base errors which are not cumulative, it will be seen that the successive line intervals of the incoming video signals are indicated at $VI_2, VI_3-VI_8$ on wave form (a), and that AND circuit 110 applies sequencing pulses to the respective counter 114 at the horizontal synchronizing intervals between successive line intervals of the incoming signals, as shown by wave form (c). Thus, as indicated by wave forms (e), (f) and (g), counter 114 produces write control signals AI, BI and CI successively in a repeating cyclic order, with the duration of each of the write control signals corresponding to that of a respective line interval of the incoming video signals. Further, as indicated by the wave form (d), in response to the read interval pulses from counter 37, the AND circuit 112 produces sequencing pulses for counter 116 at uniformly spaced apart intervals corresponding to the standard line intervals of the video signals, so that counter 116 successively produces the read control signals AO, BO and CO in repeating cyclic order, with each of the read control signals having a duration equal to that of a standard line interval, as shown by waveforms $(h),(i)$ and $(j)$.

Thus, under normal operating circumstances as shown on FIG. 4, line intervals $VI_2, VI_3$ and $VI_4$ are successively written in register units 23, 24 and 25 in response to write control signals AI, BI and CI, and such writing is effected at clocking rates dependent upon the time base errors in the respective line intervals. After being temporarily stored in the register units 23, 24 and 25, the line intervals $VI_2, VI_3$ and $VI_4$ are successively read out of such register units at the standard clocking rate in response to the read control signals AO, BO and CO, so that the read out line intervals are obtained without time base errors, as indicated at $VI'_2, VI'_3$ and $VI'_4$ in waveform $(b)$. As previously mentioned, so long as such normal operating conditions prevail, the read control signal for each of the register units, for example, the read control signal AO for the register unit 23 will begin and end within the period between successive write control signals AI for the same register unit.

Figure 5:
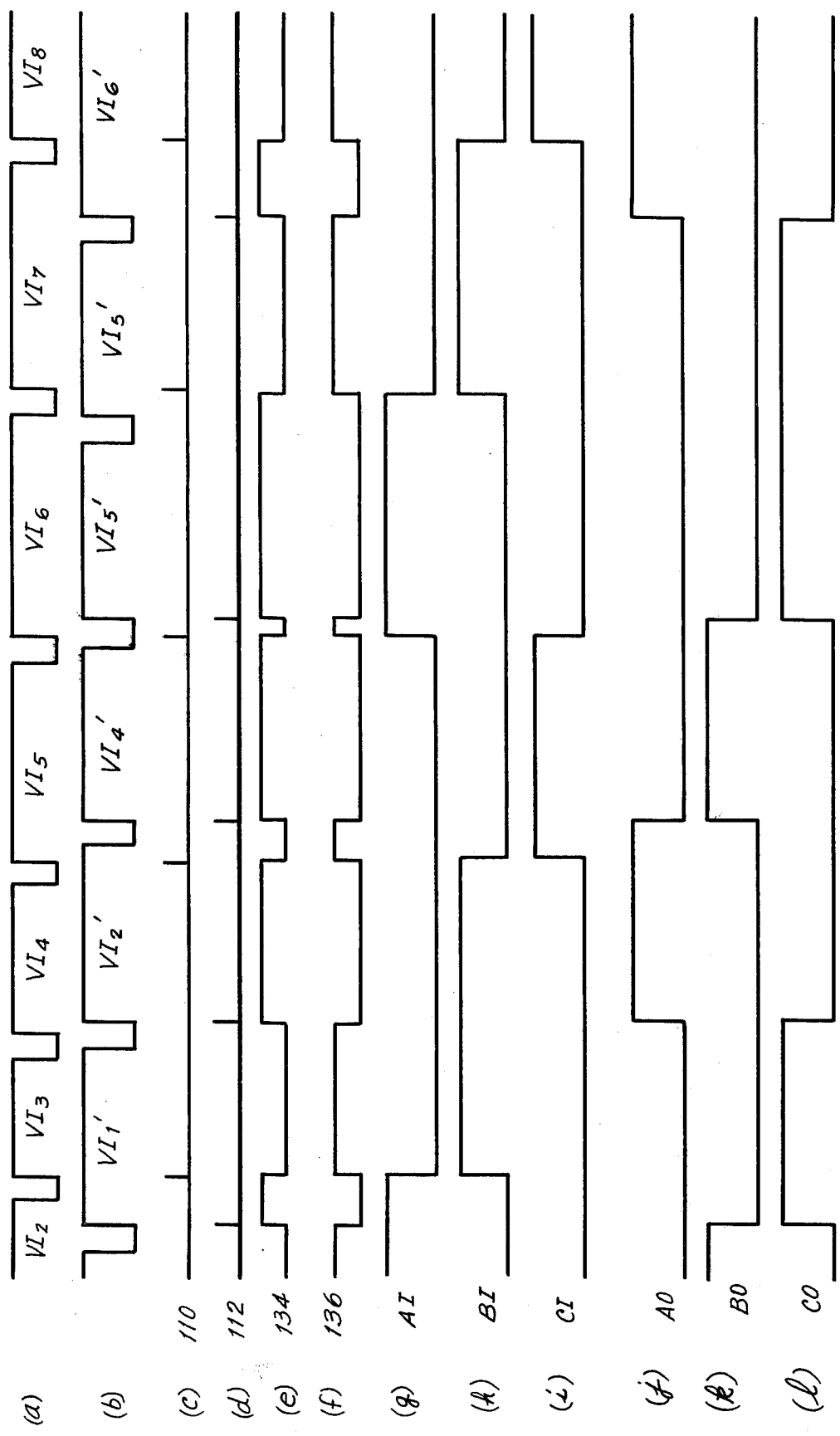

Referring now to FIG. 5, it will be seen that waveform $(a)$ shows the incoming video signals to have relatively large or excessive time base errors which cannot be corrected by the normal operation of time base corrector 10 described above with reference to FIG. 4. More particularly, it will be seen that the line interval $VI_3$ of the incoming video signals which is being written in register unit 24 in response to the write control signal BI of waveform $(h)$ terminates during the read control signal CO of waveform $(l)$ by which the line interval $VI'_1$ of the stored video signals is being read out of register unit 25. Thus, the write interval pulse from counter 27 at the conclusion of incoming line interval $VI_3$, if applied through AND circuit 110 to counter 114 would cause the latter to produce the write control signal CI for writing in register unit 25 prior to the completion of the reading out of the line interval $VI'_1$ from such register unit. However, due to the overlapping occurrence of write control signal BI and read control signal CO, AND gate 140 of logic circuit 130 applies an inhibiting pulse through OR circuit 144 to inverter 134. Thus, at the termination of incoming line interval $VI_3$, inverter 134 applies a low level or negative polarity signal to AND circuit 110, as indicated by waveform $(e)$ on FIG. 5, and the output or sequencing pulse for counter 114 that would otherwise be transmitted through AND circuit 110 in response to the next write interval pulse is blocked by AND circuit 110, as indicated by waveform $(c)$. Thus, as indicated by waveform $(h)$ on FIG. 5, the write control pulse BI for register unit 24 is extended to encompass two line intervals, for example, the line intervals $VI_3$ and $VI_4$, of the incoming video signals. As a result of the foregoing, the line interval $VI_3$ which is first written in the shift registers of unit 24 is cancelled or replaced by the next line interval $VI_4$ of the incoming video signals.

Still referring to FIG. 5, it will be seen that the line interval $VI_6$ of the incoming video signals represented by waveform $(a)$ which is being written in register unit 23 in response to write control signal AI of waveform $(g)$ extends for a time within which two successive read interval pulses from counter 37 are applied to AND circuit 112. Thus, if the second of these read interval pulses occurring before the termination of the line interval $VI_6$ of the incoming signals was applied through AND circuit 112 to counter 116 for sequencing the latter, the effect thereof would be to cause counter 116 to produce the read control signal AO for effecting read out from register unit 23 at a time when line interval $VI_6$ of the incoming video signals was still being written in that register unit. However, since write control signal AI is still occurring at the time when read control signal CO would be normally terminated, AND gate 150 of logic circuit 132 passes an inhibiting pulse or signal through OR circuit 152 to inverter 136 which thereby applies a low level or negative polarity signal to AND circuit 112, as indicated by waveform $f$ on FIG. 5. Such low level or negative polarity pulse or signal applied by inverter 136 to AND circuit 112 causes the latter to block the next received read interval pulse from counter 37 with the result that read control signal CO for causing read out from register unit 25 is extended or continued for a second line interval. By reason of the recycle loop 43 and the associated recycle gate 46, the stored line interval $VI'_5$ being read out during the first half of the read control signal CO is simultaneously rewritten in register unit 25 and again read out during the second half of read control signal CO. Thus, as indicated by wave form $(b)$ on FIG. 5, the successive line intervals read out from memory 26 at the standard clocking rate, that is, without any time base errors, will be constituted by the stored line intervals $VI'_1, VI'_2, VI'_4, VI'_5, VI'_5$ and $VI'_6$, in that order. Although the original line interval $VI_3$ is omitted from the read out and the original line interval $VI_5$ is repeated in the read out, all of the video signals in the read out are constituted by complete line intervals of the standard clocking rate, and thus neither the omission of an original line interval nor the repetition of an original line interval will cause any deterioration or other problems in video pictures reproduced from the output of time base corrector 10.

Referring now to FIG. 6, it will be seen that, when the incoming video signals contain a drop out, for example, in the line interval $VI_4$ thereof as shown by waveform $(a)$, the detection of such drop out by detector 47 causes flip-flop 106 to apply an inhibit pulse or signal to inverter 108, as indicated by waveform $(c)$, so that inverter 108 applies a low level or negative polarity signal to AND circuit 110 at the time when the next write interval pulse is applied to the latter from counter 27. Thus, such next write interval pulse is blocked at AND circuit 110 and does not cause sequencing of counter 114 so that the latter continues to produce the write control pulse CI for a second or additional line interval of the incoming video signals, as indicated by waveform $(h)$. Therefore, the incoming line interval $VI_4$ containing the drop out, and which is written in register unit 25 during the first half or line interval of write control signal CI, is cancelled or replaced by the next incoming line interval $VI_5$ which is written in register unit 25 during the later portion of write control signal CI. In other words, the incoming line interval $VI_4$ which contains a drop out is completely omitted from the stored video signals.

Due to the lengthening of the write control signal CI for omitting the incoming line interval $VI_4$ from the stored signals, as described above, the write control signal CI is still occurring at a time when the next read interval pulse would be received by AND circuit 12 from counter 37 for sequencing counter 116 so as to terminate the read control signal BO and initiate the read control signal CO. Thus, the write control signal CI and the read control signal BO are simultaneously applied to AND gate 148 of logic circuit 132 so that an inhibiting pulse or signal is applied through OR circuit 152 to inverter 136 and the latter applies a low level or negative polarity signal to AND circuit 112 for blocking the next read interval pulse, as indicated by waveform (e) on FIG. 6. Accordingly, the read control signal BO is extended for an additional standard line interval, as indicated by waveform (j), and causes the repetitive read out of the stored line interval $VI'_3$ from register unit 24. It will be apparent that, in the first half of read control signal BO, the stored line interval $VI'_3$ being read out from register unit 24 is recycled through loop 43 and recycle gate 45 so as to be rewritten in register unit 24 and hence be available to be read again during the second half of read control signal BO. Therefore, in the example illustrated by FIG. 6, the output from time base corrector 10 will consist of the stored line intervals $VI'_1$, $VI'_2$, $VI'_3$, $VI'_3$, $VI'_5$ and $VI'_6$ in that order. In such output all of the line intervals are complete and have the standard clocking rate so as to eliminate any time base errors and drop outs occurring in the incoming video signals. Once again, although incoming line intervals containing a drop out are omitted and certain incoming line intervals are repeated in the output from time base corrector 10, the foregoing do not cause any deterioration or other problems in video pictures reproduced from such output.

In the case where the synchronizing and burst signals and the blanking pulses are stripped from the incoming video signals prior to the writing of the latter in memory 26 so as to reduce the capacity of the shift registers of register units 23, 24 and 25 required to store one line interval, such synchronizing and burst signals and blanking pulses are restored or replaced in the video signals after read out from memory 26 by corresponding signals that are suitably produced or derived from the read clock pulses from generator 36.

Although memory unit 26 has to have at least three register units, as shown, the number of such register units may be greater than three. Further, although the illustrated time base corrector 10 has had its operation described with reference to a memory 26 in which each of the register units 23, 24 and 25 has a capacity sufficient to receive one line interval of the video signals, it will be apparent that the time base corrector 10 can be made to operate similarly in the case where each of the register units has a capacity sufficient to accommodate two or any other whole multiple of a line interval. Further, the memory of the time base corrector 10 may be an analog memory, such as, a charge-coupled or bucket-brigade device, in place of the illustrated digital memory, in which case the incoming video or other periodic information signals may be written in, and read out from the memory without the analog to digital conversion and without the later digital to analog conversion. It is also to be noted that a random access memory may be used instead of the shift register memory of the above described embodiment of the invention. Further, instead of digitizing and temporarily storing the successive line intervals of the incoming video signals, a differential pulse code modulation system can be employed in which only differences between successive sampling points are digitized and stored.

In the above described embodiment of the invention, the write clock pulses produced by generator 15 and the read clock pulses produced by generator 36 have been indicated to have frequencies of about 10.7MHz, that is, about three times the color subcarrier frequency for NTSC signals. However, it should be noted that other frequencies which are at least two times the color subcarrier frequency may be employed for the write clock pulses and read clock pulses in a time base corrector according to this invention.

Finally, in the above description of the illustrated embodiment of the invention, no mention has been made of velocity errors that may possibly be included in the read out video signals. Such velocity errors may be eliminated or compensated by suitably modulating the read clock pulses produced by generator 36 so that such read clock pulses, while having the standard frequency at the beginning and end of each standard line interval, may vary during each standard line interval.

Having described a specific embodiment of the invention and several modifications thereof, it is to be understood that the invention is not limited to that precise embodiment or modifications, and that various changes and further modifications may be effected by one skilled in the art without departing from the scope or spirit of the invention as defined in the appended claims.

What is claimed is:

1. A time base corrector for removing time base errors from successive intervals of information signals comprising: memory means including a plurality of registers each having a capacity sufficient to store a predetermined whole number of said intervals of the information signals; write clock generating means coupled to said input means for generating write clock pulses at a variable rate dependent upon time base errors in said information signals; read clock generating means for generating read clock pulses at a rate which is standard at least at the beginning and end of each said interval of the information signals; write selecting means actuated by said write clock pulses for writing each said interval of said information signals into a selected one of said registers; read selecting means actuated by said read clock pulses for reading out the information signals stored in a selected one of said registers; control means for generating write and read control signals applied to said write and read selecting means, respectively, and determining sequences of said registers in which the information signals are respectively written in, and read out from said registers of the memory means, said control means including first and second sequencing means respectively operative to normally produce said write control signals and said read control signals in respective predetermined sequences, first sequence inhibiting means for inhibiting operation of said first sequencing means when one of said read control signals is occurring at the normal completion of a respective one of said write control signals, and second sequence inhibiting means for inhibiting operation of said second sequencing means when one of said write control signals is occurring at the normal completion of a respective one of said read control signals; and recycle means made operative by said read control signals simultaneously with the reading out of information signals from each one of said registers for rewriting in the respective one of said registers the information signals which are being read out therefrom.

2. A time base corrector according to claim 1; further comprising detecting means receiving said information signals for detecting a drop out in the latter; and in which said control means further includes drop out compensating means responsive to detection of a drop out by said detecting means for inhibiting the operation of said first sequencing means so as to extend the writing of information signals into the then selected one of said registers and thereby replace therein the interval of the information signals having said drop out with the next interval of the information signals.

3. A time base corrector according to claim 1: further comprising means actuated by said write clock pulses for generating write interval pulses at the end of each of said intervals of the information signals received by said input means; and means actuated by said read clock pulses for generating read interval pulses with a standard rate of repetition: and in which said first sequencing means includes a first counter actuable by said write interval pulses and having a plurality of outputs corresponding respectively to said plurality of registers and at which said write control signals are produced in a repeating cyclic order; said second sequencing means includes a second counter actuable by said read interval pulses and having a plurality of outputs corresponding respectively to said plurality of registers and at which said read control signals are produced in a repeating cyclic order; said first sequence inhibiting means includes a first logic circuit receiving said read control signals and said write control signals and producing a first inhibiting pulse whenever any one of said read control pulses is occurring at the normal completion of a respective one of said write control pulses, and means responsive to said first inhibiting pulse to block actuation of said first counter by the next one of said write interval pulses; and said second sequence inhibiting means includes a second logic circuit receiving said read control signals and said write control signals and producing a second inhibiting pulse whenever any one of said write control pulses is occurring at the normal completion of a respective one of said read control pulses, and means responsive to said second inhibiting pulse to block actuation of said second counter by the next one of said read interval pulses.

4. A time base corrector accoring to claim 3: in which said means to block actuation of said first counter includes a first inverter to produce an output in the absence of said first inhibiting pulse, and a first AND circuit receiving said write interval pulses and said output of the first inverter to pass said write interval pulses to said first counter only in the presence of said output; and said means to block actuation of said second counter includes a second inverter to produce an output in the absence of said second inhibiting pulse, and a second AND circuit receiving said read interval pulses and said output of the second inverter to pass said read interval pulses to said second counter only in the presence of said output from said second inverter.

5. A time base corrector according to claim 4: further comprising detecting means receiving said information signals for detecting a drop out in the latter; and a third inverter connected between said detecting means and said first AND circuit to apply an output to the latter only in the absence of any detected drop out in the information signals so that said first AND circuit passes said write interval pulses to said first counter only in the simultaneous presence of said outputs from the first and third inverters.

6. A time base corrector according to claim 1: in which said input means includes means for converting said information signals from analog form to digital form; and further comprising means receiving the information signals read out of said registers for converting such read out signals from digital form to analog form.

7. A time base corrector for removing time base errors from video information signals comprising: memory means including a plurality of registers each having a capacity sufficient to store a predetermined whole number of line intervals of the video information signals; input means for receiving the video information signals; write clock generating means coupled to said input means for generating write clock pulses at a variable rate dependent upon time base errors in the incoming video information signals; read clock generating means for generating read clock pulses at a rate which is standard at least at the beginning and end of each standard line interval of the video information signals; write selecting means actuated by said write clock pulses for writing each line interval of the video information signals into a selected one of said registers; read selecting means actuated by said read clock pulses for reading out the video information signals stored in a selected one of said registers; control means for generating write and read control signals which are timed by said write and read clock pulses, respectively and which are applied to said write and read selecting means, respectively, for determining the repeating cyclic orders in which the video information signals are respectively written in, and read out from said registers of the memory means, said control means including first and second sequencing means normally operative in successive line intervals of the incoming video information signals and in standard line intervals of video information signals, respectively, to produce said write control signals and said read control signals in respective predetermined sequences, first sequence inhibiting means for inhibiting operation of said first sequencing means for one line interval when one of said read control signals is occurring at the normal completion of a respective one of said write control signals, and second sequence inhibiting means for inhibiting operation of said second sequencing means for one line interval when one of said write control signals is occurring at the normal completion of a respective one of said read control signals; and recycle means made operative by said read control signals simultaneously with the reading out of video information signals from each one of said registers for rewriting in the respective one of said registers the video information signals which are being read out therefrom.

8. A time base corrector according to claim 7: further comprising detecting means receiving said video information signals for detecting a drop out in the latter: and in which said control means further includes drop out compensating means responsive to detection of a drop out by said detecting means for inhibiting the operation of said first sequencing means for a line interval so as to extend the writing of information signals into the then selected one of said registers and thereby replace therein the line interval of the incoming video information signals having said drop out with the next line interval of such video information signals.

9. A time base corrector according to claim 7: further comprising means actuated by said write clock pulses for generating write interval pulses at the end of each of said intervals of the information signals received by said input means; and means actuated by said read clock pulses for generating read interval pulses with a standard rate of repetition: and in which said first sequencing means includes a first counter actuable by said write interval pulses and having a plurality of outputs corresponding respectively to said plurality of registers and at which said write control signals are produced in a repeating cyclic order; said second sequencing means includes a second counter actuable by said read interval pulses and having a plurality of outputs corresponding respectively to said plurality of registers and at which said read control signals are produced in a repeating cyclic order; said first sequence inhibiting means includes a first logic circuit receiving said read control signals and said write control signals and producing a first inhibiting pulse whenever any one of said read control pulses is occurring at the normal completion of a respective one of said write control pulses, and means responsive to said first inhibiting pulse to block actuation of said first counter by the next one of said write interval pulses; and said second sequence inhibiting means includes a second logic circuit receiving said read control signals and said write control signals and producing a second inhibiting pulse whenever any one of said write control pulses is occurring at the normal completion of a respective one of said read control pulses, and means responsive to said second inhibiting pulse to block actuation of said second counter by the next one of said read interval pulses.

10. A time base corrector according to claim 9: in which said means to block actuation of said first counter includes a first inverter to produce an output in the absence of said first inhibiting pulse, and a first AND circuit receiving said write interval pulses and said output of the first inverter to pass said write interval pulses to said first counter only in the presence of said output; and said means to block actuation of said second counter includes a second inverter to produce an output in the absence of said second inhibiting pulse, and a second AND circuit receiving said read interval pulses and said output of the second inverter to pass said read interval pulses to said second counter only in the presence of said output from said second inverter.

11. A time base corrector according to claim 10: further comprising detecting means receiving said video information signals for detecting a drop out in the latter; and a third inverter connected between said detecting means and said first AND circuit to apply an output to the latter only in the absence of any detected drop out in the video information signals so that said first AND circuit passes said write interval pulses to said first counter only in the simultaneous presence of said outputs from the first and third inverters.

12. A time base corrector according to claim 7: in which said input means includes means for converting the video information signals from analog form to digital form; and further comprising means receiving the signals read out of said registers for converting the read out signals from digital form to analog form.

13. A time base corrector for removing time base errors from video signals comprising: memory means including first, second and third shift register units each having a capacity sufficient to store a predetermined whole number of line intervals of the video signals; input means for receiving the video signals; write clock generating means coupled to said input means for generating write clock pulses at a variable rate dependent upon time base errors in incoming video signals; read clock generating means for generating read clock pulses at a rate which is standard at least at the beginning and end of each standard line interval of the video signals; write selecting means actuated by said write clock pulses for writing each line interval of said incoming video signals into a selected one of said register units; read selecting means actuated by said read clock pulses for reading out the video signals stored in a selected one of said registers; write control means operative for generating first, second and third write control signals which are timed by said write clock pulses so as to normally occur in a repeating cyclic order for the successive line intervals of said incoming video signals, and which are applied to said write selecting means for determining the sequence of writing of the video signals in said first, second and third register units, respectively; read control means operative for generating first, second and third read control signals which are timed by said read clock pulses so as to normally occur in a repeating cyclic order for successive standard line intervals with said first, second and third read control signals being normally out of phase with respect to said first, second and third write control signals, respectively, by approximately one and one-half line intervals, and with said first, second and third read control signals being applied to said read selecting means for determining the sequence of reading out of the video signals from said first, second and third register units, respectively; first sequence inhibiting means interrupting the generation of said first, second and third write control signals in said repeating cyclic order for one of said line intervals of the incoming video signals whenever any one of said read control signals is occurring at the normal completion of a respective one of said write control signals; second sequence inhibiting means interrupting the generation of said first, second and third read control signals in said repeating cyclic order thereof for one of said standard line intervals whenever any one of said write control signals is occurring at the normal completion of a respective one of said read control signals; and recycle means made operative by said read control signals simultaneously with the reading out of video signals from each one of said register units for rewriting in the respective one of said register units the video signals which are being read therefrom.

14. A time base corrector according to claim 13: further comprising means actuated by said write clock pulses for generating write interval pulses at the end of each of said line intervals of the incoming video signals received by said input means; and means actuated by said read clock pulses for generating read interval pulses with a standard rate of repetition: and in which said write control means includes a write counter actuable by said write interval pulses and having first, second and third outputs at which said first, second and third write control signals are respectively produced in a repeating cyclic order; said read control means includes a read counter actuable by said read interval pulses and having first, second and third outputs at which said first, second and third read control signals are respectively produced in a repeating cyclic order; said first sequence inhibiting means includes a first logic circuit receiving said read control signals and said write control signals and producing a first inhibiting pulse whenever any one of said read control signals is occurring at the normal completion of a respective one of said write control signals, and means responsive to said first inhibiting pulse to block actuation of said write counter by the next one of said write interval pulses; and second sequence inhibiting means includes a second logic circuit receiving said read control signals and said write control signals and producing a second inhibiting pulse whenever any one of said write control signals is occurring at the normal completion of a respective one of said read control signals, and means responsive to said second inhibiting pulse to block actuation of said write counter by the next one of said read interval pulses.

15. A time base corrector according to claim 14: in which said means to block actuation of said write counter includes a first inverter to produce an output in the absence of said first inhibiting pulse, and a first AND circuit receiving said write interval pulses and said output of the first inverter to pass said write interval pulses to said write counter only in the presence of said output; and said means to block actuation of said read counter includes a second inverter to produce an output in the absence of said second inhibiting pulse, and a second AND circuit receiving said read interval pulses and said output of the second inverter to pass said read interval pulses to said read counter only in the presence of said output from said second inverter.

16. A time base corrector according to claim 15: further comprising detecting means receiving the incoming video signals for detecting a drop out in the latter; and a third inverter connected between said detecting means and said first AND circuit to apply an output to the latter only in the absence of any drop out in the information signals so that said first AND circuit passes said write interval pulses to said write counter only in the simultaneous presence of said outputs from the first and third inverters.

17. A time base corrector according to claim 14: in which said first logic circuit includes first, second and third AND circuits which respectively receive said first write control signal and said second read control signal, said second write control signal and said third read control signal, and said third write control signal and said first read control signal, and an OR circuit for passing an output from any one of said first, second and third AND circuits of the first logic circuit as said first inhibiting pulse; and in which said second logic circuit includes first, second and third AND circuits which respectively receive said first read control signal and said second write control signal, said second read control signal and said third write control signal, and said third read control signal and said first write control signal, and an OR circuit for passing an output from any one of said first, second and third AND circuits of the second logic circuit as said second inhibiting pulse.

18. A time base corrector according to claim 13: in which said input means includes means for converting the incoming video signals from analog form to digital form; and further comprising means for converting the video signals read out of said register units from digital form to analog form.

* * * * *